United States Patent
Johnson et al.

(10) Patent No.: US 10,112,315 B2
(45) Date of Patent: Oct. 30, 2018

(54) OPTICAL FILMS HAVING AN OPTICAL AXIS AND SYSTEMS AND METHODS FOR PROCESSING SAME

(71) Applicant: 3M INNOVATIVE PROPERTIES COMPANY, St. Paul, MN (US)

(72) Inventors: Matthew B. Johnson, Woodbury, MN (US); Steven P. Floeder, Shoreview, MN (US); Kristy A. Gillette, Spring Valley, WI (US); Arthur L. Kotz, Woodbury, MN (US); Michael L. Ruegsegger, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/747,353

(22) PCT Filed: Aug. 17, 2016

(86) PCT No.: PCT/US2016/047393
§ 371 (c)(1),
(2) Date: Jan. 24, 2018

(87) PCT Pub. No.: WO2017/034892
PCT Pub. Date: Mar. 2, 2017

(65) Prior Publication Data
US 2018/0215060 A1    Aug. 2, 2018

Related U.S. Application Data (60) Provisional application No. 62/208,097, filed on Aug. 21, 2015.

(51) Int. Cl.
*B32B 3/02* (2006.01)
*B26D 5/32* (2006.01)
(Continued)

(52) U.S. Cl.
CPC .............. *B26D 5/32* (2013.01); *B26D 5/007* (2013.01); *B26F 1/44* (2013.01); *B41M 3/003* (2013.01);
(Continued)

(58) Field of Classification Search
CPC ...... G02B 5/04; G02B 5/3025; G02B 5/3033; G02B 5/3083
See application file for complete search history.

(56) References Cited

U.S. PATENT DOCUMENTS

| 5,882,774 A | 3/1999 | Jonza et al. |
| 6,609,795 B2 | 8/2003 | Weber et al. |
| (Continued) | | |

FOREIGN PATENT DOCUMENTS

| CN | 101221314 | 7/2008 |
| JP | 10253826 A * | 9/1998 |
| (Continued) | | |

OTHER PUBLICATIONS

International Search Report, International Application No. PCT/US2016/047393, dated Nov. 16, 2016, 3 pages.

*Primary Examiner* — Elizabeth E Mulvaney
(74) *Attorney, Agent, or Firm* — Clifton F. Richardson (57) ABSTRACT

Optical films having an optical axis with an orientation that varies along a width of the optical film and having one or more indicia recording the orientation of the optical axis at a plurality of locations in the optical film are provided. Systems and methods for producing and for converting the optical films are provided.

20 Claims, 5 Drawing Sheets

(51) Int. Cl.
*B41M 3/00* (2006.01)
*B26D 5/00* (2006.01)
*B26F 1/44* (2006.01)
*G02B 5/04* (2006.01)
*G02B 5/30* (2006.01)

(52) U.S. Cl.
CPC .............. *G02B 5/04* (2013.01); *G02B 5/3041* (2013.01); *G02B 5/3083* (2013.01)

(56) References Cited

U.S. PATENT DOCUMENTS

| | | | |
|---|---|---|---|
| 7,976,657 | B2 | 7/2011 | Kimura et al. |
| 7,993,476 | B2 | 8/2011 | Nakazono et al. |
| 8,016,965 | B2 | 9/2011 | Nakazono et al. |
| 8,045,151 | B2 | 10/2011 | Ohashi et al. |
| 8,248,558 | B2 | 8/2012 | Kimura et al. |
| 8,259,263 | B2 | 9/2012 | Kimura et al. |
| 8,294,872 | B2 | 10/2012 | Kimura et al. |
| 8,313,605 | B2 | 11/2012 | Yamamoto et al. |
| 8,325,318 | B2 | 12/2012 | Kimura et al. |
| 8,398,800 | B2 | 3/2013 | Yura et al. |
| 8,409,388 | B2 | 4/2013 | Yura et al. |
| 8,414,993 | B2 | 4/2013 | Nakazono et al. |
| 8,460,490 | B2 | 6/2013 | Nakasono et al. |
| 8,491,737 | B2 | 7/2013 | Kimura et al. |
| 8,936,692 | B2 | 1/2015 | Hirata et al. |
| 8,980,403 | B2 | 3/2015 | Yamamoto et al. |
| 2005/0141760 | A1 | 6/2005 | Floeder et al. |
| 2005/0232475 | A1 | 10/2005 | Floeder et al. |
| 2009/0030544 | A1 | 1/2009 | Floeder et al. |
| 2009/0284836 | A1 | 11/2009 | Boyd et al. |
| 2011/0043732 | A1 | 2/2011 | Weber et al. |
| 2012/0002154 | A1 | 1/2012 | Kimura et al. |
| 2013/0094084 | A1 | 4/2013 | Merrill et al. |

FOREIGN PATENT DOCUMENTS

| | | |
|---|---|---|
| JP | 2003-014934 | 1/2003 |
| JP | 2009-069142 | 4/2009 |
| KR | 10-2013-0075683 | 7/2013 |
| WO | WO 2007-115137 | 10/2007 |
| WO | WO 2015-025727 | 2/2015 |

\* cited by examiner

OPTICAL FILMS HAVING AN OPTICAL AXIS AND SYSTEMS AND METHODS FOR PROCESSING SAME

BACKGROUND

Optical films such as polarizers are often included in display components. Such films may have an optical axis and it may be desired to orient the optical axis in a specific direction in the display component.

SUMMARY

In some aspects of the present description, a method is provided that includes the following steps: (i) providing a continuous web of optical film where the optical film has a length along a longitudinal direction and a width along a transverse direction, the optical film has an optical axis, and an orientation of the optical axis varies across the width of the optical film; (ii) for each of at least one position along the length of the optical film, determining the orientation of the optical axis at a plurality of positions along the width of the optical film; and (iii) applying at least one indicium to a surface of the optical film where the at least one indicium records the orientation of the optical axis at the plurality of positions along the width of the optical film.

In some aspects of the present description, a method is provided that includes the following steps: (i) providing a continuous web of optical film where the optical film has a length along a longitudinal direction and a width along a transverse direction, the optical film has an optical axis having an orientation that varies across the width of the optical film, and the optical film has at least one indicium recording the orientation of the optical axis at a plurality of locations in the optical film; (ii) reading an indicium in the at least one indicium and determining therefrom the orientation of the optical axis at one or more locations in the plurality of locations in the optical film; and (iii) generating a map of a plurality of regions of the optical film to be cut out for incorporation into a product such that an orientation of each region is aligned with the orientation of the optical axis in the region.

In some aspects of the present description, an optical film having an optical axis is provided. The optical film has a length along a longitudinal direction and a width along a transverse direction. The optical axis has an orientation that varies across the width of the optical film. The optical film includes a plurality of indicia and each indicium in the plurality of indicia records the orientation of the optical axis at a plurality of locations along the width the optical film.

In some aspects of the present description, a roll of optical film having an optical axis is provided. The optical film has a length along a longitudinal direction and a width along a transverse direction. The optical axis has an orientation that varies across the width of the optical film. The optical film includes one or more indicia recording the orientation of the optical axis at a plurality of locations in the optical film.

In some aspects of the present description, a system for processing optical film is provided. The system includes a receiving device configured to receive a continuous web of the optical film, a measurement device configured to measure an optical axis of the optical film received by the receiving device at a plurality of positions along a transverse direction, a data processing device configured to receive optical axis data from the measurement device and to encode the optical axis data, and a recording device configured to receive the encoded optical axis data from the data processing device and label the optical film with the encoded optical axis data.

In some aspects of the present description, a system for processing optical film is provided. The system includes a receiving device configured to receive a continuous web of optical film, a reading device configured to read indicia on the optical film received from the receiving device; and a processing device configured to receive data from the reading device and to determine therefrom an orientation of an optical axis of the optical film at a plurality of locations in the optical film. The processing device is further configured to generate a map of a plurality of regions of the optical film such that an orientation of each region is aligned with the orientation of the optical axis in the region.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

In may be desired to incorporate optical films having an optical axis into a device or component with the optical axis aligned in a precise direction relative to the device or component. For example, it may be desired to have an optical axis of the optical film aligned at 0 degrees, 45 degrees, 90 degrees, or some other pre-determined angle, relative to a major axis (e.g., a width direction for a display panel) of the device or component. However, variations in manufacturing can result in misalignment between the optical axis of the optical film and the major axis of the device or component.

According to the present description, methods and systems are provided which allow optical films having an optical axis that varies in a width or transverse direction of the film to be precisely aligned with a device or component. This can be achieved by measuring the orientation of the optical axis at a plurality of locations in the optical film and then recording the orientations at the plurality of locations by applying (e.g., printing) indicia onto the optical film. This process can be done during (e.g., as a final or near final step) or after the optical film manufacturing process. The optical film with the indicia can then be processed (as part of the same film manufacturing and converting process or as a different converting process that may take place at a different facility, for example) by reading the indicia to determine the orientation of the optical axis at a plurality of positions in the optical film and determining orientations of regions of the optical film to cut out for inclusion in an optical component or device such that the optical axis in the region is precisely aligned with a major axis of the optical component or device. The major axis of the optical component or device may be an optical axis of the optical component or device.

Optical films having an optical axis may include one or more of a polarizer, a retarder, and a prism film. A polarizer may be a reflective polarizer and may be a polymeric multilayer reflective polarizer film such as those described in U.S. Pat. No. 5,882,774 (Jonza et al.), and U.S. Pat. No. 6,609,795 (Weber et al.), for example. The polymeric multilayer reflective polarizers may be APF (Advanced Polarizing Film) or DBEF (Dual Brightness Enhancement Film) both available from 3M Company (St. Paul, Minn.). The block axis and the pass axis are optical axes for a reflective polarizer or for an absorbing polarizer. The fast and slow axes of a retarder are optical axes of the retarder. A prism film typically includes prisms extending predominately in a direction which defines the optical axis of the prism film.

In some cases, it is desired to achieve an alignment error (angular difference between actual and desired orientation of the optical axis) of less than plus or minus 1 degree, 0.5 degrees, or 0.2 degrees and this degree of alignment error is difficult to achieve in conventional manufacturing processes. For example, it has proven difficult to produce an integrated absorbing and reflective polarizer with suitably small alignment error with conventional processes.

In some embodiments, the optical film is or includes an integrated absorbing polarizer and reflective polarizer. The reflective polarizer may be a multilayer polymeric reflective polarizer, such as APF or DBEF, and the absorbing polarizer may be an iodine stained polyvinyl alcohol (PVA) absorbing polarizer, for example. In some embodiments, the optical film includes an oriented multilayer polymeric reflective polarizer and an oriented unstained PVA layer. The unstained PVA layer may be coated onto a multilayer polymeric film, and the coated film may be stretched (e.g., uniaxially stretched) to simultaneously orient the polyvinyl alcohol chains in the PVA layer and a plurality of layers of the multilayer polymeric film. This can result in an optical film including a reflective polarizer layer and an oriented unstained PVA layer with the polyvinyl alcohol chains in the PVA layer oriented along the block axis of the reflective polarizer. The oriented unstained PVA layer may be an optical retarder. The unstained PVA layer may be stained in subsequent processing step to form an integrated absorbing polarizer and reflective polarizer with aligned block axes.

Figures 1, 2:
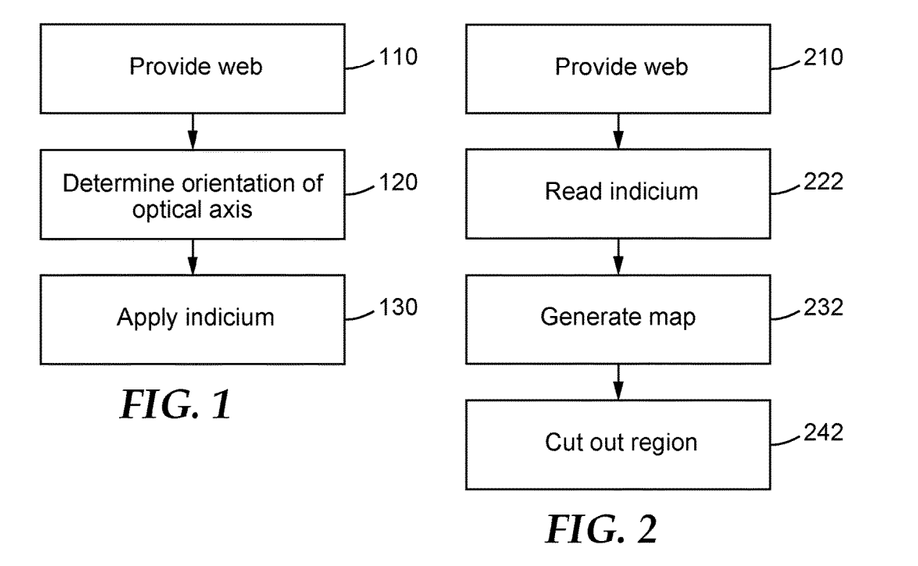
FIG. 1 is a flow chart illustrating a method for processing optical films having an optical axis.
FIG. 2 is a flow chart illustrating a method for processing an optical film having an optical axis.

FIG. 1 is a flow chart illustrating a method for processing optical films having an optical axis which might vary in the optical film (e.g., vary across a width of the optical film). It may be desired to account for such variation in a conversion process where portions of the optical film are included in electronic devices, for example. In step 110, a continuous web of optical film having an optical axis is provided. The optical film has a length along a longitudinal direction and a width along a transverse direction. An orientation of the optical axis may vary across the width of the optical film. In step 120, for each of at least one position along the length of the optical film, the orientations of the optical axis at a plurality of positions along the width of the optical film are determined. For example, the optical axis may correspond to a block or to a pass axis of a polarizer and the orientation of the optical axis may be determined using a polarimeter or a plurality of polarimeters that determine the orientation at at least one (e.g., at a plurality) position along the length of the optical film. Suitable polarimeters include those available from Axometrics, Inc. (Huntsville, Ala.), for example. In step 130, at least one indicium is applied to a surface of the optical film (e.g., by printing a barcode or fiducial marks). The at least one indicium records the orientation of the optical axis at the plurality of positions along the width of the optical film.

In some embodiments, the orientation of the optical axis is determined at a plurality of positions along the width of the optical film for each of a plurality of positions along the length of the optical film. The plurality of positions along the length of the optical film may be distributed periodically along the length, and the plurality of positions along the width of the optical film may be distributed periodically along the width.

In some embodiments, the optical film includes one or more of a polarizer, a retarder and a prism film. In some embodiments, the optical film includes at least one of a reflective polarizer and an absorptive polarizer. In some embodiments, the optical film includes the reflective polarizer and the absorptive polarizer where the reflective polarizer has a first block axis, the absorptive polarizer has a second block axis, and the reflective and absorptive polarizers are oriented such that the first and second block axes are substantially parallel.

The processing of the optical film may subsequently include a conversion of the film into products (e.g., a display panel, a phone, or a tablet). This conversion may include reading an indicium in the at least one indicium to obtain orientation data, and cutting out at least one region of the optical film where each region is oriented based on the orientation data.

FIG. 2 is a flow chart illustrating a method for processing an optical film having an optical axis. In step 210, a continuous web of the optical film is provided. The optical film has a length along a longitudinal direction and a width along a transverse direction, and an orientation of the optical axis may vary across the width of the optical film. The optical film includes at least one indicium recording the orientation of the optical axis at a plurality of locations in the optical film. The at least one indicium may have previously been applied to the optical film according to the process of FIG. 1, for example. In step 222, an indicium in the at least one indicium is read. This may be implemented with an optical scanner or camera, for example. From the indicium, the orientation of the optical axis at one or more locations in the plurality of locations in the optical film is determined. This can be done using a processor adapted to receive date from the camera, for example, that reads the at least one indicium. In step 232 a map of a plurality of regions of the optical film to be cut out for incorporation into a product such that an orientation of each region is aligned with the orientation of the optical axis in the region is generated. This step can be carried out on a processor which receives orientation data from step 222. This processor may be the same or different from any processor utilized to determine the orientation of the optical axis from the at least one indicium. The map may be a computer stored file that records the locations of the regions in the optical film. In step 242 at least one region is cut out (e.g., via die cutting) for incorporation into a product (e.g., an electrical and/or optical product such as a phone, tablet, or display panel). In some embodiments, the reading (step 222), generating (step 232) and cutting (step 242) steps are repeated for each indicium in the plurality of indicia.

In some embodiments, each region has a symmetry axis in the plane of the optical film that is substantially parallel or substantially perpendicular to the optical axis in the region. In some embodiments, each region has a symmetry axis in the plane of the optical film that is oriented at about 45 degrees or some other pre-determined skew angle relative to the optical axis in the region.

In some embodiments, the at least one indicium includes a plurality of indicia. In some embodiments, each indicium in the plurality of indicia records the orientation of the optical axis at a plurality of locations across the width of the optical film at a location along the length of the optical film proximate the indicium.

Figure 3:
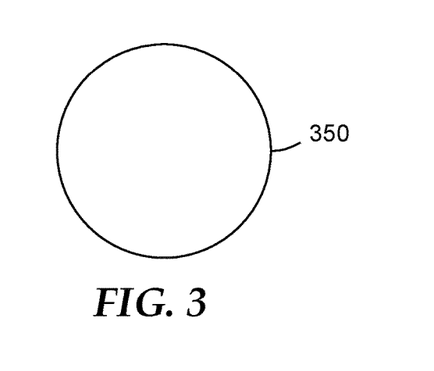
FIG. 3 is a schematic side view of a roll of optical film.

FIG. 3 is a schematic side view of a roll 350 of optical film having an optical axis provided according to process of FIG. 1. The optical film has a length along a longitudinal direction and a width along a transverse direction. The optical axis has an orientation that varies across the width of the optical film. The optical film includes one or more indicia recording the orientation of the optical axis at a plurality of locations in the optical film. In some embodiments, the one or more indicia comprises a plurality of indicia proximate an edge of the optical film. In some embodiments, each indicium in the plurality of indicia records the orientation of the optical axis at a plurality of locations across the width of the optical film at a location along the length of the optical film proximate the indicium.

Figure 4:
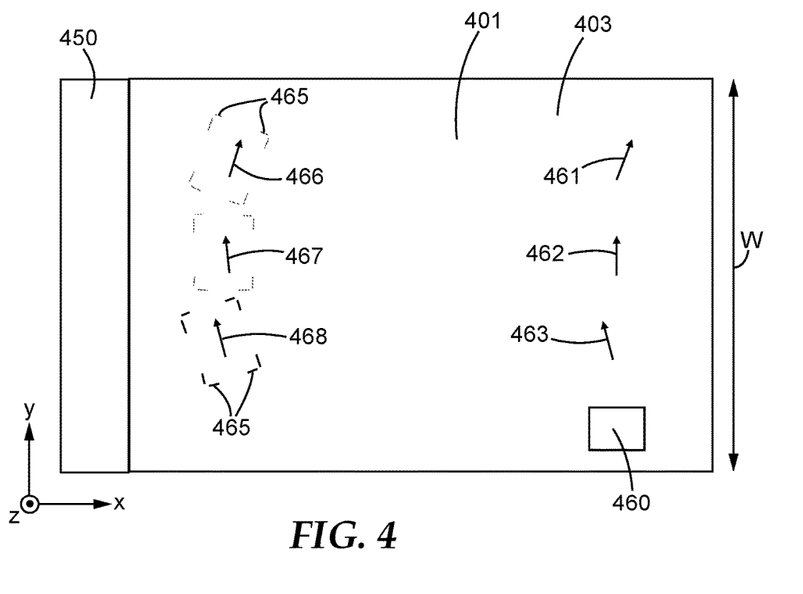
FIG. 4 is a schematic top view of a partially unrolled roll of optical film.

FIG. 4 is a schematic top view of a roll 450 of optical film 401 that is partially unrolled so that a surface 403 of the optical film 401 is visible. Roll 450 may correspond to roll 350. Optical film 401 has a length along a longitudinal or machine direction (the x-direction for the unrolled portion of the film) and a width W along a transverse direction (the y-direction). The orientations 461, 462 and 463 of the optical axis at three positions along the width of the optical film is illustrated in FIG. 4. In the illustrated embodiment, the optical axis is oriented primarily along the transverse direction with relatively small variations about the transverse direction. In other embodiments, the optical axis is oriented primarily along the longitudinal direction with relatively small variations about the longitudinal direction. In still other embodiments, the optical axis may be oriented primarily at some pre-determined skew angle (e.g., 45 degrees) relative to the longitudinal and transverse directions. The optical film 401 may have a length that is at least 5, or at least 10, or at least 20, or at least 50, or at least 100 times the width W of the optical film 401. In some embodiments, the width W may be at least 1 meter, or at least 1.5 meters, or at least 2 meters. In some embodiments, the width W may be in the range of 1 meter to 3.5 meters, or to 4 meters, or to 5 meters.

The optical film 401 includes one or more indicia recording the orientation of the optical axis at a plurality of locations in the film. The indicia may be printed on the major surface 403 of the optical film 401. Indicium 460 records the orientations 461, 462 and 463 of the optical axis at three locations along the width of the optical film 401. In other embodiments, indicium 460 records the orientation of the optical axis at any number of locations along the width of the optical film 401. A plurality of indicia (e.g., at least 2, or at least 3, or at least 5, or at least 10) may be included along a length of the optical film 401 with each of the indicia recording the orientation of the optical axis at a plurality of positions (e.g., at least 2, or at least 3, or at least 5, or at least 10, or at least 20) along a width of the optical film 401.

The number of indicia included along the length of the film may be selected based on the degree of variability of the optical axis along the length of the film. In some cases, the optical axis may not vary significantly in the length direction and a single indicium may be used to characterize the optical axis throughout the entire roll 450 of optical film 401. In other embodiments, the optical axis may vary significantly in the length direction and an indicium may be included at least at every 1, 10, or 20 meters, for example, along the length of the optical film 401. In some embodiments, the indicia recording the optical axis at the plurality of positions along the width of the optical film 401 may be distributed periodically along the length of the optical film 401. In some embodiments, the plurality of positions along the width of the optical film 401 may be distributed periodically along the width of the optical film 401. The number of positions along the width of the optical film 401 may be selected based on how rapidly the orientation of the optical axis varies along the width or depending on the size of the regions of the optical film 401 that is intended to be cut out for incorporation into an electronic device, for example.

One or more indicia in the plurality of indicia may include a bar code. For example, indicium 460 may be a bar code. In some embodiments, one or more indicia in the plurality of indicia includes fiducial marks. For example, indicium 465 includes a plurality of fiducial marks recording the orientations 466, 467, and 468 of the optical axis at a three locations along the width of the optical film 401.

Figure 5:
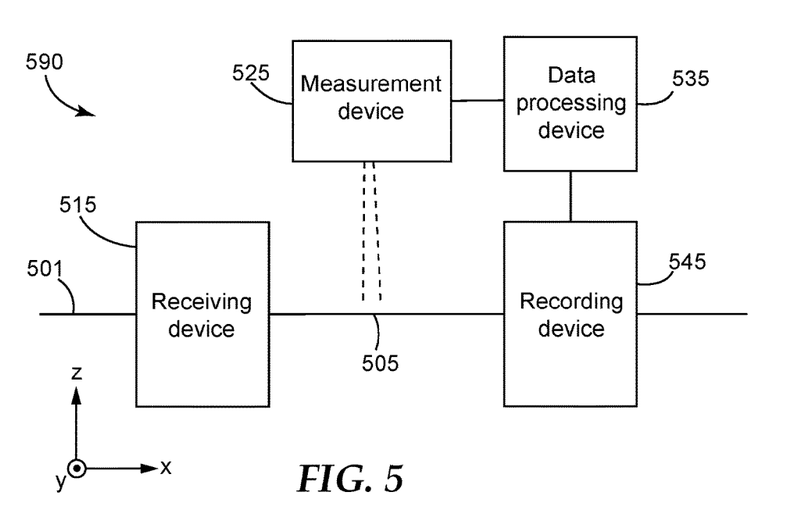
FIG. 5 is a schematic illustration of a system for processing optical film.

FIG. 5 is a schematic illustration of system 590 including a receiving device 515 configured to receive a continuous web of optical film 501, a measurement device 525 configured to measure an optical axis of the optical film 501 received by the receiving device 515 at a plurality of positions 505 along a transverse direction (y-direction), a data processing device 535 configured to receive optical axis data from the measurement device 525 and to encode the optical axis data, a recording device 545 configured to receive the encoded optical axis data from the data processing device 535 and label the optical film with the encoded optical axis data. In some embodiments, the recording device 545 is configured to print indicia encoding the optical axis data.

In some embodiments, system 590 also includes one or more additional processing units not illustrated in FIG. 5. In some embodiments, system 590 further includes a wind-up device configured to receive the optical film 501 from the recording device 545 and to produce a roll of the optical film 501. In some embodiments, an additional processing unit is configured to receive the optical film from the recording device 545 and the wind-up device is configured to receive the optical film 501 from the additional processing unit. It will be understood that the various devices shown in FIG. 5 may be separate components, may be components within a single machine, or some combination of the devices may be components of one machine and another combination of the devices may be components of another machine, for example.

Figure 6:
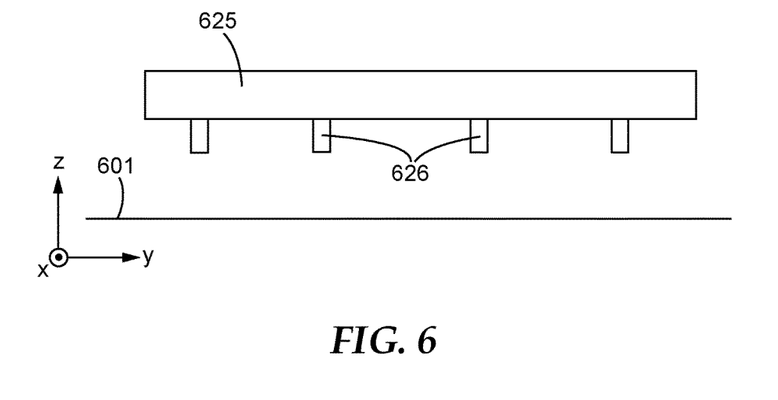
FIG. 6 is a schematic illustration of a measurement device.

FIG. 6 is a schematic illustration of measurement device 625, which may correspond to measurement device 525, including a plurality of sensors 626 for measuring the optical axis of the optical film 601 at a plurality of positions along a transverse direction (y-direction). Sensors 626 may further include portions (not illustrated) below the optical film 601. Sensors 626 may be polarimeters or may be cameras, for example.

Figure 7:
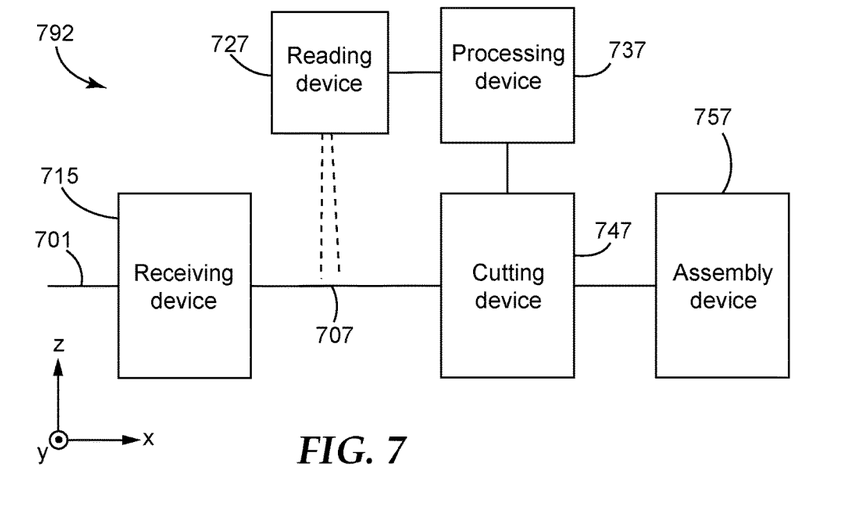
FIG. 7 is a schematic illustration of a system for processing optical film.

FIG. 7 is a schematic illustration of system 792 including a receiving device 715 configured to receive a continuous web of optical film 701, a reading device 727 configured to read indicia on the optical film 701 received from the receiving device 715, a processing device 737 configured to receive data from the reading device 727 and to determine therefrom an orientation of an optical axis of the optical film 701 at a plurality of locations 707 in the optical film 701. The processing device 737 may be configured to generate a map of a plurality of regions of the optical film such that an orientation of each region is aligned with the orientation of the optical axis in the region. System 792 further includes a cutting device 747 configured to cut out the plurality of regions of the optical film 701, and an assembly device 757 configured to receive the cut out regions from the cutting device 747 and to incorporate at least some of the regions into electronic devices. In some embodiments, system 792 also includes one or more additional processing units not illustrated in FIG. 7. It will be understood that the various devices shown in FIG. 7 may be separate components, may be components within a single machine, or some combination of the devices may be components of one machine and another combination of the devices may be components of another machine, for example.

Figure 8:
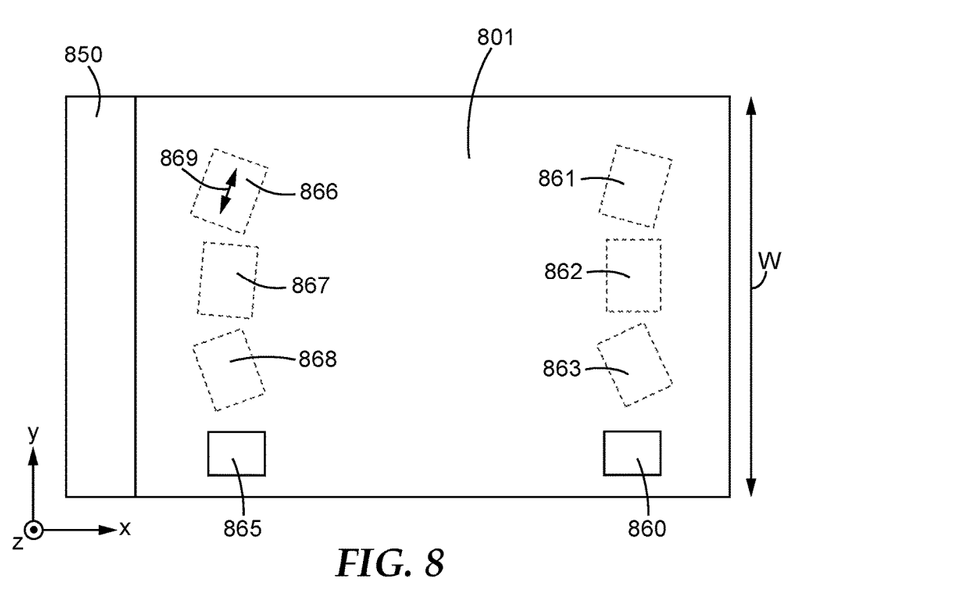
FIG. 8 is a schematic top view of a partially unrolled roll of optical film.

FIG. 8 is a schematic top view of a roll 850 of optical film 801 that is partially unrolled so that a surface 803 of the optical film 801 is visible. Optical film 801 has a length along a longitudinal or machine direction (the x-direction for the unrolled portion of the film) and a width W along a transverse direction (the y-direction). Optical film includes indicia 860 and 865 recording an orientation of an optical axis of the optical film 801 at a plurality of locations in the optical film 701. Indicium 860 records an orientation of the optical axis in each of the regions 861, 862 and 863; and indicium 865 records an orientation of the optical axis in each of the regions 866, 867 and 868. In the illustrated embodiment, the optical axis is along a major axis (e.g., predominately along the y-axis) of each of the rectangular regions 861-863 and 866-868. The major axis is a symmetry axis of the region. For example, axis 869 is a symmetry axis for region 866 and an optical axis of the optical film 801 in region 866. In some embodiments, the optical axis may be at a pre-determined skew angle (e.g. 45 degrees) relative to a symmetry axis of the region. The orientation of the optical axis in a region may be determined at any location in the region; for example, at a center or centroid of the region.

In the illustrated embodiments, three regions are illustrated across the width W of the optical film at a position along a length of the optical film. In other embodiments, there may be at least 5, or at least 10, or at least 20 regions included across the width W of the optical film. The number and distribution of regions in optical film 850 may correspond to the number and distribution of locations at which the orientation of the optical axis was determined as described in connection with FIG. 4.

Figure 9:
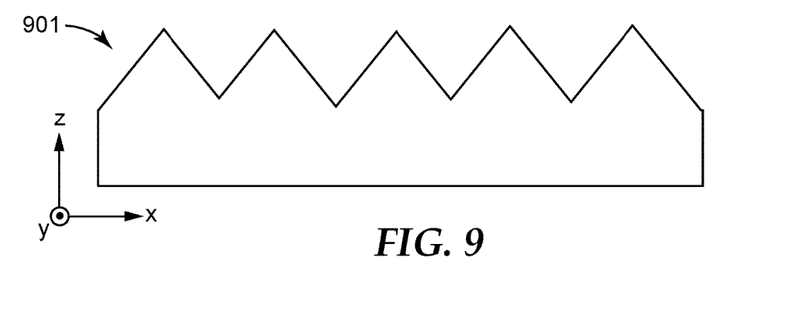
FIGS. 9-10 are side views of optical films.

FIG. 9 is a side view of an optical film 901 which includes prisms extending in the y-direction. The prisms define an optical axis extending predominately in the y-direction. Optical film 901 may include indicia recording the orientation of the optical axis at a plurality of locations along a width of the optical film 901. Optical film 901 can be made or processed using the methods and systems described elsewhere herein.

Figure 10:
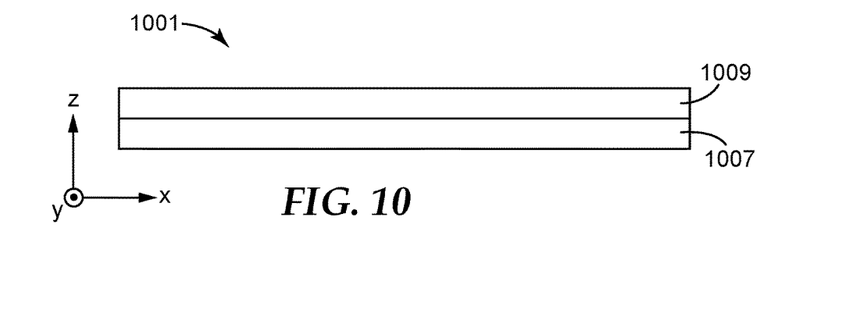

FIG. 10 is a side view of an optical film 1001 include a first layer 1007 and a second layer 1009. In some embodiments, first layer 1007 is a polarizer and second layer 1009 is a retarder. In some embodiments, first layer 1007 is a first polarizer and second layer 1009 is a second polarizer. The first polarizer may be a reflective polarizer and the second polarizer may be an absorptive polarizer with the block axes of the first and second polarizers substantially aligned. In some embodiments, the first layer 1007 is a polymeric multilayer reflective polarizer, such as APF, and the second layer 1009 is an oriented unstained PVA layer with the orientation of the PVA molecules in the PVA layer substantially aligned with a block axis of the polymeric multilayer reflective polarizer.

EXAMPLES

Examples 1-3

Figure 11:
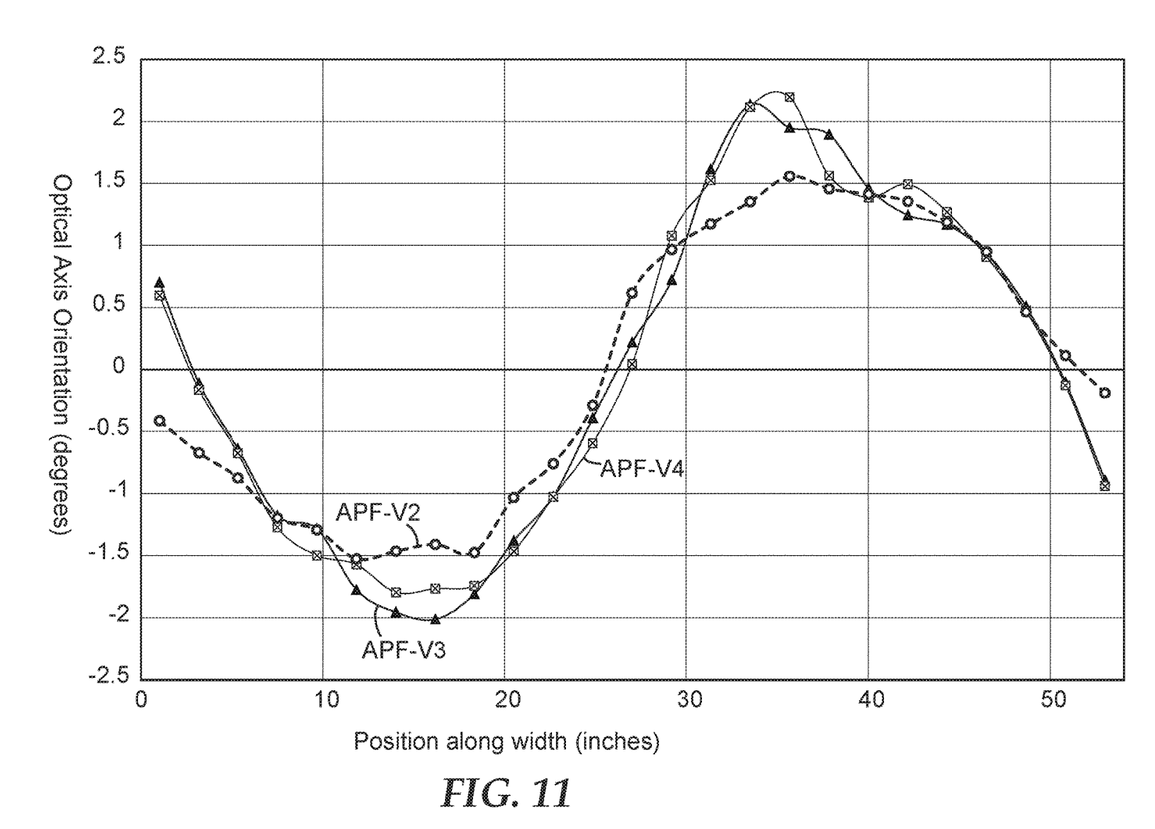
FIG. 11 shows plots of optical axis orientations versus position along the width of optical films.

Three multilayer polymeric reflective polarizer film samples were prepared for determination of the direction of the optical axis (black axis) of the film. Each sample was a 3 inch (7.6 cm) strip cut cross-web from a 52 inch (132 cm) wide film. The samples were cut from APF-V2 (Example 1), APF-V3 (Example 2), and APF-V4 (Example 3) reflective polarizing films (each available from 3M Company, St. Paul Minn.). The direction of the optical axis was measured cross-web for each sample at intervals of 2 to 3 inches (5.1 to 7.6 cm) using an Andor CCD spectrophotometer (available from Andor Technology Ltd., Belfast, Northern Ireland) and a Glan-Thompson polarizer positioned above the film and a light source positioned below the film. The angular orientation of the Glan-Thompson polarizer was varied and the orientation of the Glan-Thompson polarizer when the spectrophotometer recorded a minimum was determined. The orientation of the pass axis of the Glan-Thompson polarizer was along the block axis of the reflective polarizer sample at the minimum in transmission. This allowed the optical axis (block axis) of the reflective polarizer samples to be determined. Directions of the optical axis determined in this way for the three film samples are shown in FIG. 11 which provides plots of the angular orientation of the optical axis versus the position along the width of the reflective polarizer samples with an orientation of the optical axis of zero degrees corresponding to the block axis oriented in the cross-web direction.

The following is a list of exemplary embodiments of the present description.

Embodiment 1 is a method comprising:

providing a continuous web of optical film, the optical film having a length along a longitudinal direction and a width along a transverse direction, the optical film having an optical axis, an orientation of the optical axis varying across the width of the optical film;

for each of at least one position along the length of the optical film, determining the orientation of the optical axis at a plurality of positions along the width of the optical film; and applying at least one indicium to a surface of the optical film, the at least one indicium recording the orientation of the optical axis at the plurality of positions along the width of the optical film.

Embodiment 2 is the method of embodiment 1, wherein the at least one position along the length of the optical film is a plurality of positions along the length of the optical film.

Embodiment 3 is the method of embodiment 2, wherein the plurality of positions along the length of the optical film are distributed periodically along the length.

Embodiment 4 is the method of embodiment 1, wherein the plurality of positions along the width of the optical film are distributed periodically along the width.

Embodiment 5 is the method of embodiment 1, wherein applying the at least one indicium comprises printing the at least one indicium.

Embodiment 6 is the method of embodiment 1, wherein the at least one indicium includes a barcode.

Embodiment 7 is the method of embodiment 1, wherein the at least one indicium includes fiducial marks.

Embodiment 8 is the method of embodiment 1, wherein the optical film comprises one or more of a polarizer, a retarder and a prism film.

Embodiment 9 is the method of embodiment 1, wherein the optical film comprises at least one of a reflective polarizer and an absorptive polarizer.

Embodiment 10 is the method of embodiment 9, wherein the optical film comprises the reflective polarizer and the absorptive polarizer, and wherein the reflective polarizer has a first block axis, the absorptive polarizer has a second block axis, and the reflective and absorptive polarizers are oriented such that the first and second block axes are substantially parallel.

Embodiment 11 is the method of embodiment 1, further comprising:
reading an indicium in the at least one indicium to obtain orientation data;
cutting out at least one region of the optical film, each region in the at least one region oriented based on the orientation data.

Embodiment 12 is a method comprising:
providing a continuous web of optical film, the optical film having a length along a longitudinal direction and a width along a transverse direction, the optical film having an optical axis, an orientation of the optical axis varying across the width of the optical film, the optical film having at least one indicium, the at least one indicium recording the orientation of the optical axis at a plurality of locations in the optical film;
reading an indicium in the at least one indicium and determining therefrom the orientation of the optical axis at one or more locations in the plurality of locations in the optical film; and
generating a map of a plurality of regions of the optical film to be cut out for incorporation into a product such that an orientation of each region is aligned with the orientation of the optical axis in the region.

Embodiment 13 is the method of embodiment 12, further comprising cutting out at least one of the regions.

Embodiment 14 is the method of embodiment 12, wherein each region has a symmetry axis in the plane of the optical film that is substantially parallel or substantially perpendicular to the optical axis in the region.

Embodiment 15 is the method of embodiment 12, wherein each region has a symmetry axis in the plane of the optical film that is oriented at about 45 degrees relative to the optical axis in the region.

Embodiment 16 is the method of embodiment 12, wherein the at least one indicium includes a plurality of indicia.

Embodiment 17 is the method of embodiment 16, wherein each indicium in the plurality of indicia records the orientation of the optical axis at a plurality of locations across the width of the optical film at a location along the length of the optical film proximate the indicium.

Embodiment 18 is the method of embodiment 17, wherein the reading and generating steps are repeated for each indicium in the plurality of indicia.

Embodiment 19 is a roll of optical film, the optical film having a length along a longitudinal direction and a width along a transverse direction, the optical film having an optical axis, the optical axis having an orientation that varies across the width of the optical film, wherein the optical film includes one or more indicia, the one or more indicia recording the orientation of the optical axis at a plurality of locations in the optical film.

Embodiment 20 is the roll of optical film of embodiment 19, wherein the one or more indicia comprises a plurality of indicia proximate an edge of the optical film.

Embodiment 21 is the roll of optical film of embodiment 20, wherein each indicium in the plurality of indicia records the orientation of the optical axis at a plurality of locations across the width of the optical film at a location along the length of the optical film proximate the indicium.

Embodiment 22 is a system comprising:
a receiving device configured to receive a continuous web of optical film,
a measurement device configured to measure an optical axis of the optical film received by the receiving device at a plurality of positions along a transverse direction,
a data processing device configured to receive optical axis data from the measurement device and to encode the optical axis data; and
a recording device configured to receive the encoded optical axis data from the data processing device and label the optical film with the encoded optical axis data.

Embodiment 23 is the system of embodiment 22, wherein the measurement device comprises a plurality of polarimeters.

Embodiment 24 is the system of embodiment 22, wherein the recording device is configured to print indicia comprising the encoded optical axis data.

Embodiment 25 is the system of embodiment 22, further comprising a wind-up device configured to receive the optical film from the recording device and to produce a roll of the optical film.

Embodiment 26 is the system of embodiment 25, wherein an additional processing unit is configured to receive the optical film from the recording device and the wind-up device is configured to receive the optical film from the additional processing unit.

Embodiment 27 is a system comprising:
a receiving device configured to receive a continuous web of optical film,
a reading device configured to read indicia on the optical film received from the receiving device; and
a processing device configured to receive data from the reading device and to determine therefrom an orientation of an optical axis of the optical film at a plurality of locations in the optical film, the processing device further configured to generate a map of a plurality of regions of the optical film such that an orientation of each region is aligned with the orientation of the optical axis in the region.

Embodiment 28 is the system of embodiment 27, further comprising a cutting device configured to cut out the plurality of regions of the optical film.

Embodiment 29 is the system of embodiment 28, further comprising an assembly device configured to receive the cut out regions from the cutting device and to incorporate at least some of the regions into electronic devices.

Embodiment 30 is an optical film having an optical axis, wherein the optical film has a length along a longitudinal direction and a width along a transverse direction, wherein the optical axis has an orientation that varies across the width of the optical film, wherein the optical film includes a plurality of indicia, each indicium in the plurality of indicia recording the orientation of the optical axis at a plurality of locations along the width of the optical film.

Embodiment 31 is the optical film of embodiment 30, wherein each indicium in the plurality of indicia is disposed proximate an edge of the optical film.

Embodiment 32 is the optical film of embodiment 31, wherein each indicium in the plurality of indicia records the orientation of the optical axis at a plurality of locations across the width of the optical film at a location along the length of the optical film proximate the indicium.

Embodiment 33 is the optical film of embodiment 32, wherein the plurality of indicia includes at least 3 indicia and the plurality of locations across the width of the optical film includes at least 5 locations.

Embodiment 34 is the optical film of embodiment 30, wherein the length of the optical film is at least 10 times the width of the optical film.

Embodiment 35 is a roll of the optical film of embodiment 30.

It will be understood that various features for any of the films, systems or methods described herein apply to other films, systems and methods described unless the context clearly indicates differently. Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method comprising:
providing a continuous web of optical film, the optical film having a length along a longitudinal direction and a width along a transverse direction, the optical film having an optical axis, an orientation of the optical axis varying across the width of the optical film;
for each of at least one position along the length of the optical film, determining the orientation of the optical axis at a plurality of positions along the width of the optical film; and
applying at least one indicium to a surface of the optical film, the at least one indicium recording the orientation of the optical axis at the plurality of positions along the width of the optical film.

2. The method of claim 1, wherein the optical film comprises one or more of a polarizer, a retarder and a prism film.

3. The method of claim 1, wherein the optical film comprises at least one of a reflective polarizer and an absorptive polarizer.

4. The method of claim 3, wherein the optical film comprises the reflective polarizer and the absorptive polarizer, and wherein the reflective polarizer has a first block axis, the absorptive polarizer has a second block axis, and the reflective and absorptive polarizers are oriented such that the first and second block axes are substantially parallel.

5. The method of claim 1, further comprising:
reading an indicium in the at least one indicium to obtain orientation data;
cutting out at least one region of the optical film, each region in the at least one region oriented based on the orientation data.

6. A method comprising:
providing a continuous web of optical film, the optical film having a length along a longitudinal direction and a width along a transverse direction, the optical film having an optical axis, an orientation of the optical axis varying across the width of the optical film, the optical film having at least one indicium, the at least one indicium recording the orientation of the optical axis at a plurality of locations in the optical film;
reading an indicium in the at least one indicium and determining therefrom the orientation of the optical axis at one or more locations in the plurality of locations in the optical film; and
generating a map of a plurality of regions of the optical film to be cut out for incorporation into a product such that an orientation of each region is aligned with the orientation of the optical axis in the region.

7. The method of claim 6, further comprising cutting out at least one of the regions.

8. The method of claim 6, wherein each region has a symmetry axis in the plane of the optical film that is substantially parallel or substantially perpendicular to the optical axis in the region.

9. The method of claim 6, wherein each region has a symmetry axis in the plane of the optical film that is oriented at about 45 degrees relative to the optical axis in the region.

10. An optical film having a length along a longitudinal direction and a width along a transverse direction, the optical film having an optical axis, the optical axis having an orientation that varies across the width of the optical film, wherein the optical film includes one or more indicia, the one or more indicia recording the orientation of the optical axis at a plurality of locations in the optical film.

11. The optical film of claim 10, wherein the one or more indicia comprises a plurality of indicia proximate an edge of the optical film.

12. The optical film of claim 11, wherein each indicium in the plurality of indicia records the orientation of the optical axis at a plurality of locations across the width of the optical film at a location along the length of the optical film proximate the indicium.

13. A system comprising:
a receiving device configured to receive a continuous web of optical film,
a measurement device configured to measure an optical axis of the optical film received by the receiving device at a plurality of positions along a transverse direction,
a data processing device configured to receive optical axis data from the measurement device and to encode the optical axis data; and a recording device configured to receive the encoded optical axis data from the data processing device and label the optical film with the encoded optical axis data.

14. The system of claim 13, wherein the measurement device comprises a plurality of polarimeters.

15. The system of claim 13, wherein the recording device is configured to print indicia comprising the encoded optical axis data.

16. A system comprising:
a receiving device configured to receive a continuous web of optical film,
a reading device configured to read indicia on the optical film received from the receiving device; and
a processing device configured to receive data from the reading device and to determine therefrom an orientation of an optical axis of the optical film at a plurality of locations in the optical film, the processing device further configured to generate a map of a plurality of regions of the optical film such that an orientation of each region is aligned with the orientation of the optical axis in the region.

17. A roll of the optical film of claim 10.

18. The optical film of claim 10, wherein the length of the optical film is at least 10 times the width of the optical film.

19. The optical film of claim 12, wherein the plurality of indicia includes at least 3 indicia and the plurality of locations across the width of the optical film includes at least 5 locations.

20. The optical film of claim 12, wherein the plurality of indicia includes at least 5 indicia and the plurality of locations across the width of the optical film includes at least 10 locations.

* * * * *